United States Patent [19]

Skelly et al.

[11] 4,098,570
[45] Jul. 4, 1978

[54] PROCESS FOR DYEING OR PRINTING POLYAMIDE MATERIAL

[75] Inventors: James Kenneth Skelly, Wilmslow; David George Evans, Rochdale, both of England

[73] Assignee: Ciba-Geigy Corporation, Ardsley, N.Y.

[21] Appl. No.: 783,994

[22] Filed: Apr. 4, 1977

[30] Foreign Application Priority Data

Apr. 9, 1976 [GB] United Kingdom ............. 14487/76

[51] Int. Cl.² .............................................. G09B 27/00
[52] U.S. Cl. ................................... 8/41 B; 8/1 XB;
8/54; 8/76; 8/174; 8/178 R; 260/174
[58] Field of Search ................ 8/41 B, 1 XB, 178 R, 8/76; 260/174

[56] References Cited

FOREIGN PATENT DOCUMENTS 42,466   1/1888   Fed. Rep. of Germany.
3,994, of   1888   United Kingdom.

*Primary Examiner*—A. Lionel Clingman
*Attorney, Agent, or Firm*—Edward McC. Roberts; Prabodh I. Almaula

[57] ABSTRACT

A process for dyeing or printing materials made from natural or synthetic polyamide, which process comprises treating these materials with a dye liquor or printing paste containing the dye of the formula I

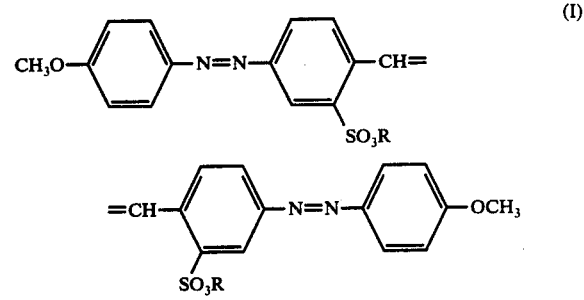

wherein R represents hydrogen or a metal cation, as well as water and, optionally, further additives.

7 Claims, No Drawings

PROCESS FOR DYEING OR PRINTING POLYAMIDE MATERIAL

The present invention relates to a process for dyeing or printing natural or synthetic polyamide materials with the stilbene dye of the formula I

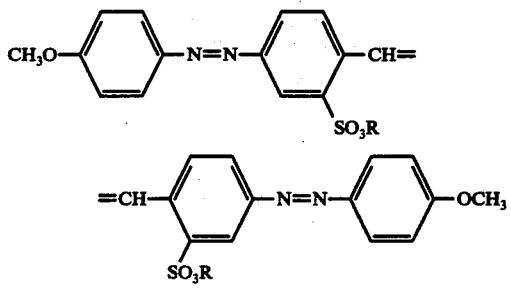

wherein R represents hydrogen or a metal cation, particularly potassium or sodium; to printing pastes and dye liquors which contain this dye; and to the dyed or printed material obtained by this process.

The known dye of the formula II

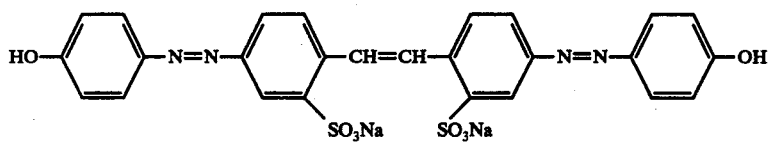

has the disadvantage that it is sensitive to the action of alkali. Material dyed with this dye can therefore become discoloured during washing with alkaline detergents or if drops or alkaline agents fall on to it.

It has already been suggested in order to overcome this disadvantage that the hydroxy groups be ethylated (German Pat. No. 42466), as a result of which there is obtained the dye of the formula III

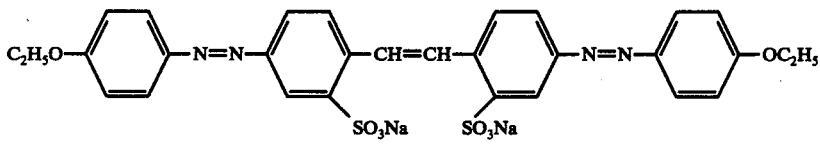

There are difficulties created however also by this dye. A printing paste is usually prepared by boiling the dye with water to obtain a solution or fine dispersion, and then adding thickeners and other additives. The dye of the formula III on cooling does not remain as a fine dispersion in water but forms lumps.

It has now been found that surprisingly the dye of the formula I obtained by conversion of the hydroxy groups of the dye of the formula II into methoxy groups does not have any of the aforementioned disadvantages of the dyes of the formulae II and III.

The dye of the formula I is obtained by reacting the dye of the formula II in a known manner with a methylating agent, such as diazomethane, dimethylsulphate or methyl iodide, preferably however with methyl chloride.

The present invention relates to a process for dyeing or printing materials made from natural or synthetic polyamide, which process comprises treating these materials with a printing paste or dye liquor containing water, the dye of the formula I and, optionally, further additives. Preferably, the materials to be dyed or printed are impregnated with the above-mentioned printing paste or dye liquor, optionally dried, and subsequently steamed, washed and dried.

Suitable material made from natural polyamide, which can be dyed or printed by the process according to the invention, is for example wool; and suitable synthetic polyamide materials are, e.g., condensation products from ε-caprolactam (polyamide 6), from adipic acid and hexamethylenediamine (polyamide 6.6 = nylon), from sebacic acid and hexamethylenediamine (polyamide 6.10) or from ω-aminoundecanoic acid (polyamide 11).

The process according to the invention is preferably applied for dyeing or printing carpets. The exhaust process is used or preferably a printing process or continuous dyeing process.

The printing paste or dye liquor according to the invention contains water, the dye of the formula I and, optionally, further additives. These are, for example, auxiliaries, i.e., organic compounds which constitute a solvent for the dye, which are liquid under dyeing conditions, are insoluble or negligibly soluble in water, and in which the dye is more readily soluble than in water. Examples of such auxiliaries are benzyl alcohol and also compounds of the general formula IV

wherein R represents a phenyl group optionally substituted by chlorine, and n represents a number from 1 to 3.

Suitable as compounds of the formula IV which can be used in the process according to the invention are phenoxyethanol, and compounds composed of an average of one mole of ethylene oxide per mole of dichlorophenol or preferably monochlorophenol. Examples of these compounds which give particularly good results are those derived from one mole of ethylene oxide and o-, m- or p-chlorophenol or mixtures of these compounds.

These auxiliaries are used in amounts of 1 to 5, preferably 2 to 4, percent by volume, relative to the total volume of the aqueous printing paste or dye liquor.

The dye liquor or printing paste can if required also contain inorganic or organic acids as well as water-soluble salts thereof, which are customarily used in dyeing processes for adjustment of the pH value to between 5 and 7, e.g. phosphoric acid, sodium phosphate, ammonium acetate or ammonium sulphate, alkyl- or arylsulphonic acid, formic acid, lactic acid, chloroacetic acid and, in particular, acetic acid for wool and polyamides, and sodium chloride for cotton. These additives are preferably employed in amounts of 1 5 percent by weight, relative to the total weight of the dye liquor or printing paste.

The dye liquor or printing paste preferably contains a thickening agent normally used in textile printing, which agent is compatible with the dye, e.g. an agent based on gum (guar gum) or on locust bean gum ether. Other usual additives can likewise be present, for example solvents for the dye, such as urea, and oxidising agents such as sodium chlorate.

Furthermore, the dye liquor or printing paste can if necessary contain anionic or nonionic surface-active agents, or other auxiliaries such as moth-proofing agents, antifoaming agents or sequestering agents.

The amount of dye used depends on the circumstances, e.g. on the depth of colour desired, and can be approximately in the range of 0.1 to 1 percent by weight, but preferably it is at least 0.2 percent by weight, relative to the total weight of the dye liquor or printing paste. The ratio of goods to liquor is usually 5:1 to 40:1.

When a printing process or continuous dyeing process is performed, impregnation with the dye is effected advantageously at a temperature below the fixing temperature of the dye. The impregnating temperature can be for example up to 60° C; it is however preferably room temperature.

In a continuous dyeing process, the material is firstly impregnated with the dye liquor and subsequently the excess liquor is squeezed out, e.g. by rollers.

The printing paste is applied by the usual methods, for example with a screen printing machine, vigoureux printing machine or other type of printing machine.

After impregnation, the material is optionally dried, then steamed, washed and dried. Steaming can be performed at a temperature up to 150° C, preferably at 100° to 110° C; for example with saturated or superheated steam at atmospheric pressure. The pressure can if required be up to 0.5 atmosphere higher.

If the dyeing is carried out by the exhaust process, the material can be immersed in the aqueous dye liquor, which contains the dye and optionally further additives, at a temperature of about 40° to 60° C. The temperature is subsequently raised and the dyeing is continued, e.g. between 80° C and the boiling point. The duration of dyeing can vary depending on the requirements, and is for example 15 minutes to 2 hours. The material is then washed and dried in the usual manner.

The following Examples illustrate the invention. In the Examples, percentages are given as percent by weight and the temperatures in degrees Centigrade.

EXAMPLE 1

The dye of the formula I (publishing house) of Julius Spinger 1938, pp. 222 and 223, but using 31 g of methyl chloride instead of 40 g of chloroethyl.

EXAMPLE 2

A printing paste is produced from
4 g of the dye of the formula I,
2 g of an auxiliary containing alkylphenolethoxylate, coconut oil acid amide and solvent,
550 g of 4% thickener solution based on gum (guar gum),
10 g of 80% acetic acid, and
434 g of water.

A nylon carpet is printed with this printing paste at 15° in the screen printing process; it is dried and then steamed for 10 minutes in saturated steam at atmospheric pressure. The carpet is subsequently carefully washed with cold water and dried. There is obtained a carpet displaying a yellow printing which has sharp contours and which is not changed in shade when drops of alkaline solutions are allowed to fall on to it.

EXAMPLE 3

100 g of nylon 66 fabric is immersed in an aqueous dye bath containing
4 g of the dye of the formula I,
20 g of benzyl alcohol,
10 g of glacial acetic acid, and
1000 g of water.

The fabric is introduced into the dye bath at 40°; the bath is subsequently heated to the boiling point, and dyeing is continued for 1 hour at this temperature. The fabric is then washed with water and dried. There is thus obtained a fabric dyed in a level yellow shade.

EXAMPLE 4

100 g of nylon 66 carpet yarn is immersed in an aqueous dye bath which contains per liter
1 g of the dye of the formula I,
2 g of sodium dihydrogen phosphate,
0.5 g of disodium hydrogen phosphate, and
1 g of an auxiliary consisting of an aqueous solution of alkylamine polyglycol ether and hexamine containing an aldehyde.

The yarn is placed into the bath at 40°; this is then heated to 100° and dyeing is continued for 1 hour. The yarn is subsequently washed and dried. There is thus obtained a yarn dyed in a level shade of yellow.

EXAMPLE 5

100 g of nylon tufted carpet is immersed in an aqueous dye bath containing per liter
2 g of the dye of the formula I,
2 g of the thickening agent based on locust bean gum ether,
2 g of sodium dihydrogen phosphate, and
2 g of the auxiliary from Example 2.

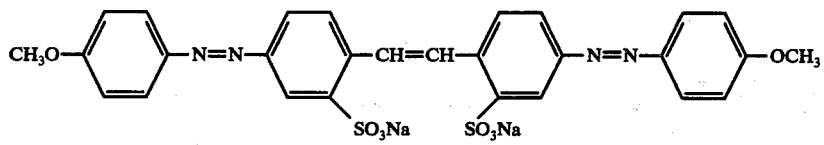
(I)

is obtained by operating exactly as described in "Grundlegende Operation der Farbenchemie" (Fundamental Operation of Colour Chemistry) by Dr. H. E. Fierz-David and Dr. J. Blangey, 4th Edition, Vienna, Verlag After being immersed, the carpet material is taken out and held vertically to allow excess dye bath liquor to drip off, so that the known slop-padding procedure in the continuous carpet dyeing process is imitated. The liquor absorption is 450%. The impregnated sample of carpet is subsequently steamed in a loop steamer for 8 minutes at 101° in saturated steam. There is thus obtained a sample of carpet dyed in a level gold-yellow shade.

EXAMPLE 6

If the procedure is carried out exactly as described in Example 5 except that instead of the dye bath used therein there is used a bath containing per liter
2 g of the dye of the formula I,
0.4 g of the dye of the formula V

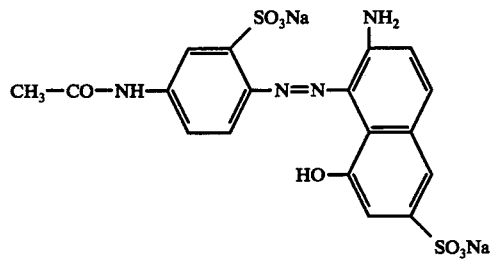

0.3 g of the dye of the formula VI

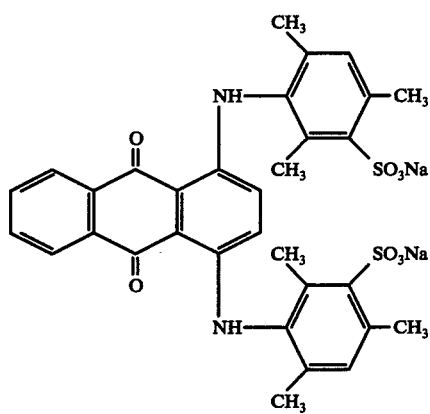

2 g of the thickening agent based on locust bean gum ether,
2 g of sodium dihydrogen phosphate, and
2 g of the auxiliary from Example 2, the result is a sample of carpet dyed in a level yellowish-brown shade.

We claim:

1. A process for dyeing or printing materials made from natural or synthetic polyamide, which process comprises treating these materials with a dye liquor or printing paste containing the dye of the formula I

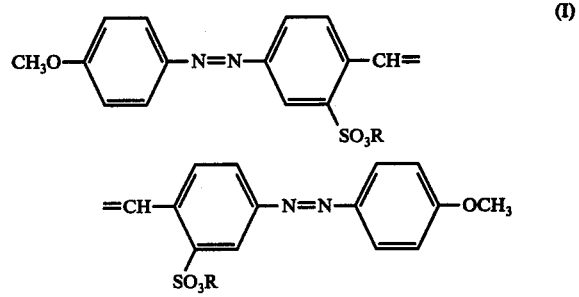

wherein R represents hydrogen or a metal cation, as well as water and, with or without further additives.

2. A process according to claim 1, wherein these materials are impregnated with a dye liquor or printing paste according to claim 1 by means of pad dyeing or printing, without without being dried, and subsequently steamed, washed and dried.

3. An aqueous dye liquor or printing paste which contains water, the dye of the formula I,

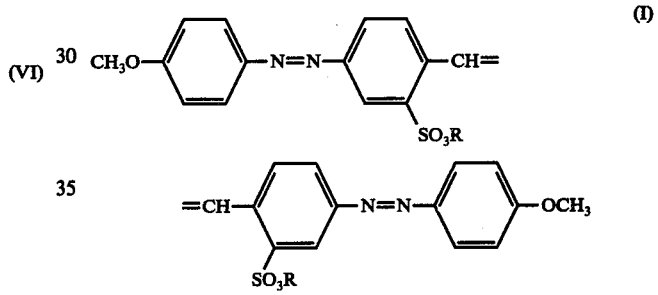

wherein R represents hydrogen or a metal cation, and with or without further additives.

4. A dye liquor or printing paste according to claim 3 which contains water, the dye of the formula I, a thickening agent and, with or without further additives.

5. A dye liquor or printing paste according to claim 4 which contains at least 0.2 percent by weight of dye, relative to the total weight of the dye liquor or printing paste.

6. A process according to claim 1 wherein the material used is carpet.

7. The material dyed or printed by the process according to claim 1.

UNITED STATES PATENT AND TRADEMARK OFFICE
CERTIFICATE OF CORRECTION

PATENT NO. : 4,098,570
DATED : July 4, 1978
INVENTOR(S) : James Kenneth Skelly & David George Evans It is certified that error appears in the above-identified patent and that said Letters Patent are hereby corrected as shown below:

Claim 2, Col. 6, Line 24 reads: "without without"

Should read --with or without--.

Signed and Sealed this

Fourth Day of March 1980

[SEAL]

Attest:

SIDNEY A. DIAMOND

Attesting Officer

Commissioner of Patents and Trademarks